United States Patent
Ganesalingam et al.

(10) Patent No.: US 9,883,333 B2
(45) Date of Patent: Jan. 30, 2018

(54) METHOD AND APPARATUS FOR IDENTIFYING AND COMMUNICATING LOCATIONS

(71) Applicant: WHAT3WORDS LIMITED, London (GB)

(72) Inventors: Mohan Ganesalingam, London (GB); Christopher Sheldrick, London (GB); Jack Waley-Cohen, London (GB)

( * ) Notice: Subject to any disclaimer, the term of this patent is extended or adjusted under 35 U.S.C. 154(b) by 0 days.

(21) Appl. No.: 14/785,347

(22) PCT Filed: Apr. 14, 2014

(86) PCT No.: PCT/GB2014/051152
§ 371 (c)(1),
(2) Date: Oct. 18, 2015

(87) PCT Pub. No.: WO2014/170646
PCT Pub. Date: Oct. 23, 2014

(65) Prior Publication Data
US 2016/0073225 A1    Mar. 10, 2016

(30) Foreign Application Priority Data
Apr. 19, 2013 (GB) .................................. 1307148.5

(51) Int. Cl.
*H04W 24/00* (2009.01)
*H04W 4/02* (2009.01)

(52) U.S. Cl.
CPC ............. *H04W 4/02* (2013.01); *H04W 4/021* (2013.01)

(58) Field of Classification Search
CPC .... G06F 9/4443; G06F 1/1626; H04W 64/00; H04W 4/008; H04W 4/023; H04W 4/028; H04W 8/18

(Continued)

(56) References Cited

U.S. PATENT DOCUMENTS

2002/0004701 A1* 1/2002 Nakano .................. G01C 21/32
                                                            701/532
2008/0301263 A1* 12/2008 Atarashi ................ G01C 21/32
                                                            709/219
(Continued)

FOREIGN PATENT DOCUMENTS

DE      19841732 A1    3/2000
EP      1640941 A1     3/2006

OTHER PUBLICATIONS

European Patent Office (EPO), International Search Report for international patent application PCT/GB2014/051152, dated Jun. 27, 2014, pp. 1-3, EPO.

*Primary Examiner* — Ronald Eisner

(57) ABSTRACT

A method of producing a location identifier comprising: obtaining the geographical coordinates of a location; converting the geographical coordinates into single unique value n; converting the single unique value n into a unique group of a plurality of values; converting the plurality of values into an equal plurality of respective words; and providing the plurality of words as a location identifier, and a method of identifying a location comprising: obtaining a location identifier for a location, the location identifier comprising a plurality of words; converting the plurality of words into a unique group of an equal plurality of respective values; converting the unique group of a plurality of values into a single unique value n; converting the single unique value n into geographical coordinates; and outputting the geographical coordinates.

26 Claims, 4 Drawing Sheets

(58) Field of Classification Search
USPC .............. 455/404.1, 404.2, 456.1–457;
340/539.13, 988–996; D10/104.2
See application file for complete search history.

(56) References Cited

U.S. PATENT DOCUMENTS

| | | | | |
|---|---|---|---|---|
| 2009/0005083 | A1* | 1/2009 | Hoshino | G01S 5/14 455/456.5 |
| 2010/0279708 | A1* | 11/2010 | Lidsrom | H04W 4/02 455/456.1 |
| 2014/0053088 | A1* | 2/2014 | Civelli | G06F 3/04817 715/760 |

* cited by examiner

METHOD AND APPARATUS FOR IDENTIFYING AND COMMUNICATING LOCATIONS

This invention relates to generally a method and apparatus for identifying and communication locations, and in particular to a method and apparatus for identifying and communicating locations in a human-friendly manner.

BACKGROUND

In recent years, satellite based location systems have come into general use which are able to determine the location of a device incorporating the location system with very great accuracy. As well as being incorporated into specialist navigation devices, such satellite based location systems are routinely included in smartphones and similar mobile communication and/or general purpose computing devices.

The use of geometric numerical coordinates to identify locations, such as latitude and longitude coordinates or grid references, is well known, and satellite based location systems generally identify locations using such numerical coordinates. For example, the GPS system identifies locations using GPS coordinates, which are commonly presented as high resolution latitude and longitude coordinates.

One practical problem with using numerical coordinates to identify locations is that the resulting strings of numbers are very user unfriendly for users. In practice people generally find that strings of numbers are difficult to accurately remember or communicate verbally to others. Further, accurately manually inputting strings of numbers into a device, for example to tell a navigation device where you wish to go, or to incorporate a location into a message sent to another person, can be relatively slow and time consuming.

In some cases locations are identified using other means such as post codes or street names, possibly together with building numbers, but these approaches suffer from the problem that they may be relatively inaccurate and are generally only assigned to buildings. In particular, post codes are generally only assigned to locations where it is expected that post will be delivered or picked up. As a result, these approaches are often only useful in urban areas where a high density of suitable codes, names and numbers have been assigned. Further, post codes are not necessarily any easier to remember and communicate verbally than numerical coordinates. Further, different countries or regions use different systems for identifying addresses, and many of these address systems are relatively unsophisticated and of limited value for identifying or communicating specific locations.

Preferably the present method and apparatus address this problem.

GENERAL

In a first aspect, the invention provides a computer implemented method of producing a location identifier comprising: receiving at a processor geographical coordinates of a location; at said processor performing the steps of:
converting the geographical coordinates into a single unique value n;
converting the single unique value n into a unique group of a plurality of values; and
converting the plurality of values into an equal plurality of respective words; and making the plurality of words available as a location identifier.

Preferably, the method further comprises defining an array of cells across a geographical area; and at said processor performing the step of converting the geographical coordinates into a single unique value n comprises performing the steps of: converting the geographical coordinates into a cell identity value identifying the cell containing the location, and a cell position value identifying the position of the location within the cell; and converting the cell identity value and a cell position value into a single unique value n.

Preferably, the geographical coordinates are latitude and longitude coordinates.

Preferably, the plurality of words is in a defined sequence.

Preferably, the cell identity value is a pair of integers X, Y and the cell position value is a pair of integers x, y.

Preferably, the value n, and the plurality of values are integers.

Preferably, the latitude and longitude coordinates are converted into the cell identity value and the cell position value using the equations:

$X = \text{floor}((\text{Longitude}+180)*24)$ $Y = \text{floor}((\text{Latitude}+90)*24)$ $x = \text{floor}(W(Y)*\text{frac}((\text{Longitude}+180)*24))$ $y = \text{floor}(1546*\text{frac}((\text{Latitude}+90)*24))$ where $W(Y) = \max(1, \text{floor}(1546*\cos((Y+0.5)/24-90)))$.

Preferably, the cell identity value and cell position values X, Y, x and y are converted into a single unique value n by assigning each cell identified by a cell identity value X, Y a unique range of values of n having a lowest value q, and then obtaining n using the equation:

$n = q + 1546*x + y.$

Preferably, the single unique value n is converted into a unique group of three values i, j, k, the three values i, j and k are converted into three respective words; and the three words are provided as a location identifier.

Preferably, converting the single unique value n into the unique group of three values i, j, k comprises: converting the single unique value n into a single unique integer value m by dividing the possible values of n into blocks of values, and shuffling the values of n in a block of values to obtain m.

Preferably, converting the single unique value n into a unique group of three values i, j, k further comprises converting the single unique value m into a unique group of three values i, j, k by:
defining $l = \text{floor}(\text{cuberoot}(m))$; then
in the case where $l^3 \le m < l^3 + l^2 + 2l + 1$, then
$i = l$, $j = r \text{ div}(l+1)$, and $k = r \text{ mod}(l+1)$, where $r = m - l^3$; or
in the case where $l^3 + l^2 + 2l + 1 \le m < l^3 + 2l^2 + 3l + 1$, then
$i = r \text{ div}(l+1)$, $j = l$, and $k = r \text{ mod }(l+1)$, where $r = m - (l^3 + l^2 + 2l + 1)$; or
in the case where $l^3 + 2l^2 + 3l + 1 \le m < l^3 + 3l^2 + 3l + 1$, then
$i = r \text{ div } l$, $j = r \text{ mod } l$, $k = l$, where $r = m - (l^3 + 2l^2 + 3l + 1)$.

Preferably, the unique group of three values i, j, k are converted into three respective words by comparing each value to an ordered list of words and converting each value to the word at the position of the value in the ordered list.

In a second aspect, the invention provides an apparatus adapted to produce a location identifier by carrying out the method of the first aspect.

In a third aspect, the invention provides a location identifier producing computer program comprising computer readable instructions which, when executed by a processor will cause the processor to carry out the steps of the method of the first aspect.

In a fourth aspect, the invention provides a computer implemented method of identifying a location comprising:
receiving at a processor a location identifier for a location, the location identifier comprising a plurality of words;
at said processor performing the steps of:
converting the plurality of words into a unique group of an equal plurality of respective values;
converting the unique group of a plurality of values into a single unique value n;
converting the single unique value n into geographical coordinates; and
outputting the geographical coordinates.

Preferably, the method further comprises defining an array of cells across a geographical area; and at said processor performing the step of converting the single unique value n into geographical coordinates comprises performing the steps of:
converting the single unique value n into a cell identity value identifying the cell containing the location and a cell position value identifying the position of the location within the cell; and
converting the cell identity value and the cell position value into geographical coordinates.

Preferably, the geographical coordinates are latitude and longitude coordinates.

Preferably, the plurality of words is in a defined sequence.

Preferably, the cell identity value is a pair of integers X, Y and the cell position value is a pair of integers x, y.

Preferably, the value n and the plurality of values are integers.

Preferably, the cell identity value and the cell position value are converted into geographical coordinates using the equations:

$$\text{Latitude}=(Y+((y+0.5)/1546))/24*90$$

$$\text{Longitude}=(X+((x+0.5)/(W(Y))))/24-180$$

where $W(Y)=\max(1,\text{floor}(1546*\cos((Y+0.5)/24-90)))$.

Preferably, the single unique value n is converted into the cell identity value and cell position values X, Y, x and y by associating each cell identified by a cell identity value X, Y with a unique range of values of n, each unique range having a lowest value q, and identifying the assigned range of values of n in which the value n lies; then taking the cell identity value X, Y associated with the identified assigned range, and determining x and y using the equations;

$$x=(n-q)\text{div }1546$$

$$y=(n-q)\text{mod }1546.$$

Preferably, the plurality of words comprises three words; the three words are converted into a unique group of three respective values i, j and k; and the unique group of three values i, j, k are converted into a single unique value n;

Preferably, converting the unique set of three values i, j, k into the single unique value n comprises: converting a single unique integer value m into the single unique value n by dividing the possible values of m into blocks of values of equal size, and shuffling the values of m in a block of values to obtain n.

Preferably, converting the unique group of three values i, j, k into the single unique value n further comprises converting the single unique value m into a unique group of three values i, j, k by:
defining l=max(i; j; k); then
in the case where i=l, then
m=l³+(l+1)j+k; or
in the case where j=l, then
m=l³+l²+2l+1+(l+1)i+k; or
in the case where k=l, then
m=l³+2l²+3l+1+li+j.

Preferably, the three words are converted into the unique group of three respective values j, k by storing the words and integer values in an associative array, and looking up the word corresponding to each integer.

In a fifth aspect, the invention provides an apparatus adapted to identify a location by carrying out the method of the fourth aspect.

In a sixth aspect, the invention provides a location identifying computer program comprising computer readable instructions which, when executed by a processor will cause the processor to carry out the steps of the method of the fourth aspect.

The invention further provides systems, devices and articles of manufacture for implementing any of the aforementioned aspects of the invention.

DESCRIPTION OF FIGURES

The invention will now be described in detail with reference to the following figures in which.

DETAILED DESCRIPTION

Figure 1:
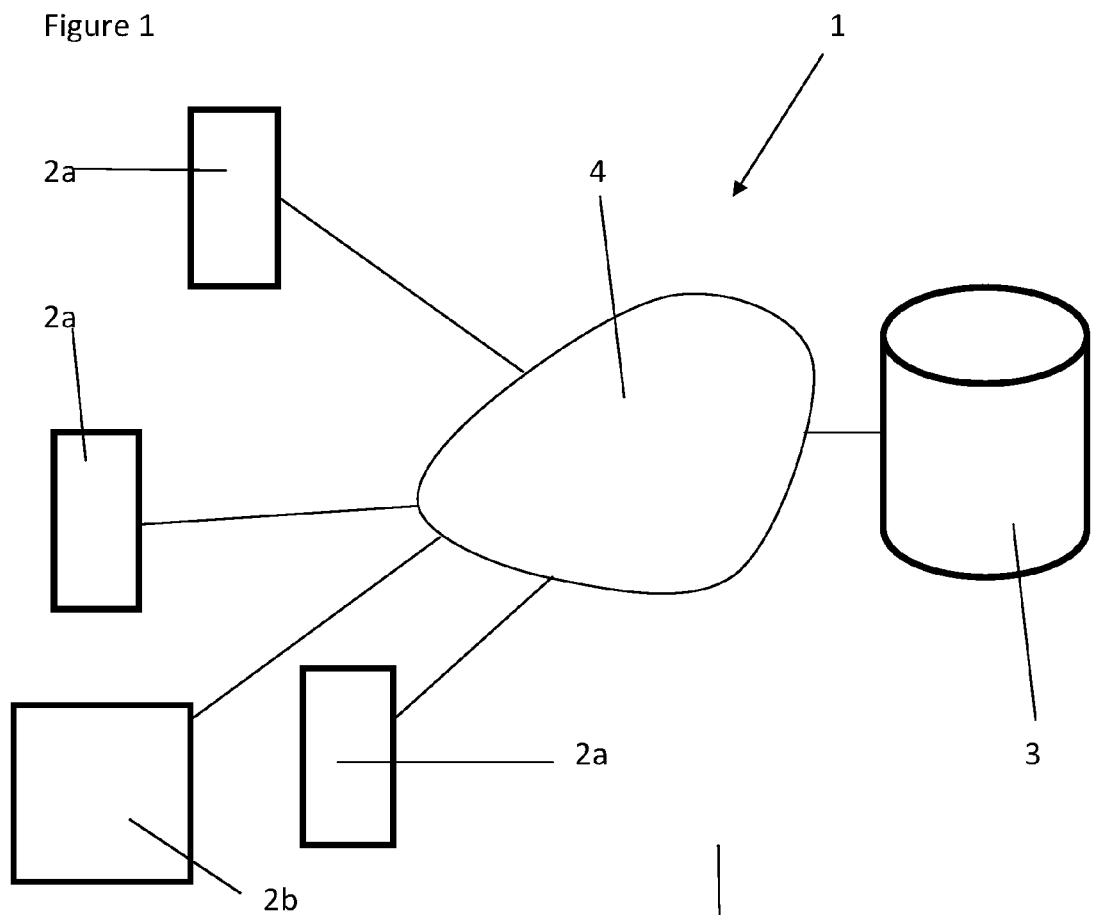
FIG. 1 is a diagram of an example of a system according to the present invention.

FIG. 1 illustrates an overview of an example of a location identification and communicating system 1 according to the present invention.

The system 1 comprises a number of user devices 2 and a central server 3. The user devices 2 comprise smartphones 2a and personal computers (PCs) 2b, each of the user devices 2, that is the user smartphones 2a and user PCs 2b being able to communicate with the central server 3 through the Internet 4. Although, for clarity, only three user smartphones 2a and a single user PC 2b are shown in FIG. 1, it will be understood that in practice the system 1 may comprise a large number of user devices 2, such as user smartphones 2a and user PCs 2b.

Figure 2:
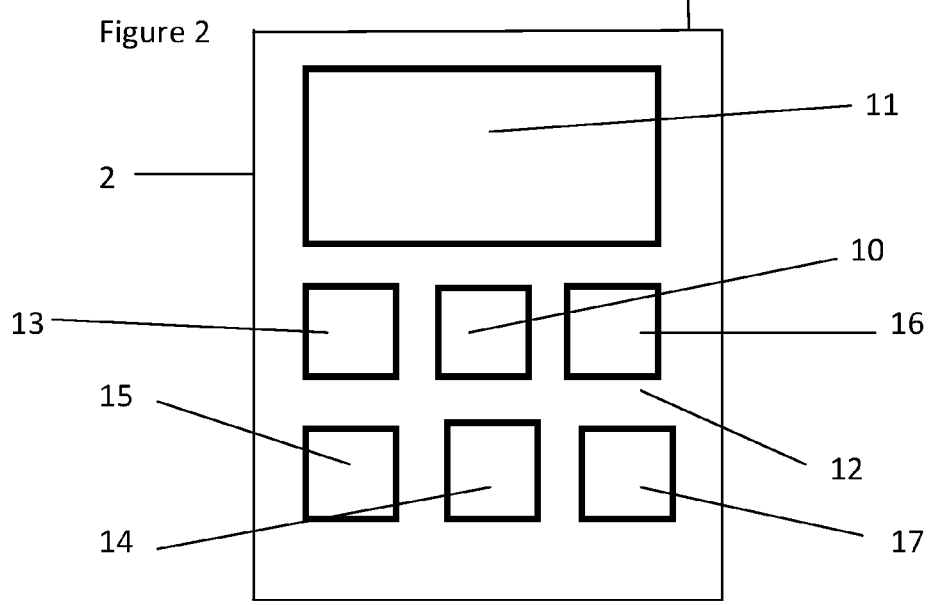
FIG. 2 is a diagram of an example of user device used in the system of FIG. 1.

FIG. 2 illustrates an example of a user smartphone 2a of the system 1 in more detail. As shown in FIG. 2, a user smartphone 2a includes a data processor 10, a visual display 11, a user interface 12 allowing user instructions to be input to the smartphone 2a, a speaker 13 and a microphone 14. The various components of the smartphone 2a operate under the control of the processor 10. The user interface 12 may be integrated with the visual display as a touch screen display. In other examples the user interface 12 may be a dedicated keypad separate from the visual display. Smartphones including these components are well known to the skilled person, so these need not be described in detail. It will be understood that user PCs 2b will have similar functionality.

Further, the smartphone 2a comprises a location determining means 15, a mapping or navigation module 16, and a location identifying module 11. The navigation module 16 and location identifying module 17 are arranged to receive position information from the location determining means 15. In the illustrated example the location determining means 15 is a global positioning system (GPS). In other examples different satellite based navigation system may be used. The navigation module 16 and the location identifying module 17 may comprise dedicated hardware, or may comprise software programs or applications running on a processor 10 of the smartphone 2a. In some examples a user PC 2b may not comprise a location determining means 15. In some examples a user PC 2b which does not comprise a location determining means may still have access to location information from a separate location determining means.

The location identifying module 17 uses the position information provided by the location determining means 15 to provide location based services to a user.

For clarity, the operation of the system 1 with a user smartphone 2a comprising a location determining means 15 will be discussed.

Figure 3:
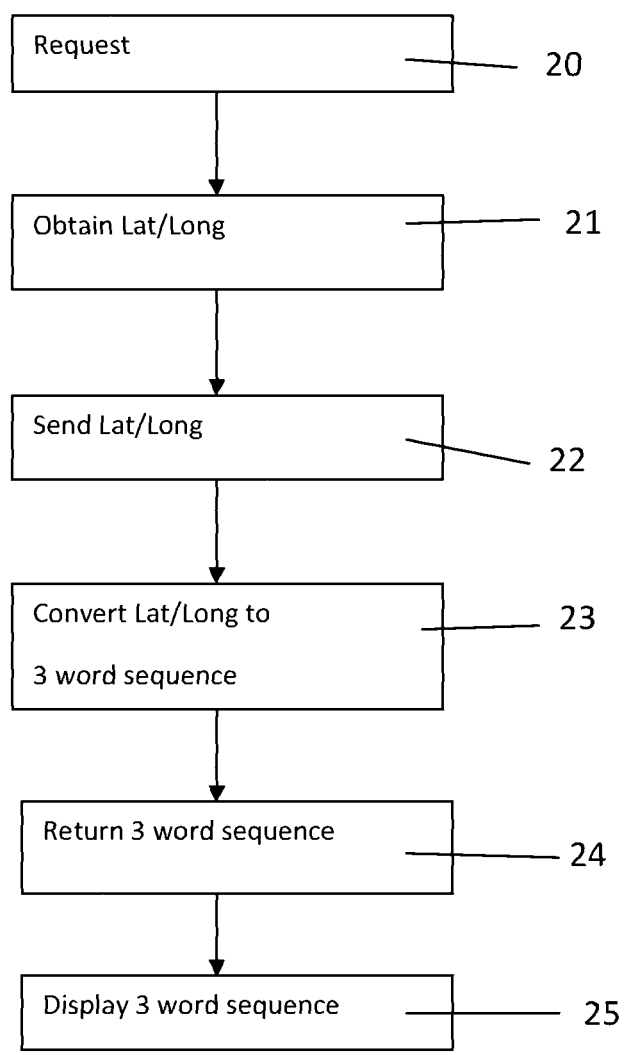
FIG. 3 is a flow diagram of operation in a first direction of the system of FIG. 1.

FIG. 3 is a flow chart of an example of a location based service according to the present invention. In the example of FIG. 3, the smartphone 2a provides the user with information identifying the current location of the user in response to a user request. The user may, for example, want this information so that the user can communicate the location to someone else. For example, the user may want to inform someone else of the user's current location.

Firstly, the user makes a request for identification of their current location to the smartphone 2a using the user interface 12 in a requesting step 20. In response to this request the location identifying module 17 obtains the current location coordinates of the smartphone 2a from the location determining means 15 in an obtaining step 21. These current location coordinates are provided by the location determining means 15 as GPS coordinates, which are latitude and longitude coordinates to six decimal places, for example "52.123456, −0.654321". Positional coordinates are readily available to this degree of accuracy from satellite based navigation systems such as GPS.

The obtained latitude and longitude coordinates of the current position of the smartphone 2a are then sent by the location identifying module 17 to the server 3 through the internet 4 using the communications functionality of the smartphone 2a in a sending step 22.

The server 3 then converts the received latitude and longitude coordinates into a location identifier comprising a unique three word sequence, for example "tablet microphone excited", in a converting step 23. This conversion is carried out using an algorithm described in detail below.

The server 3 then returns the three word sequence location identifier to the location identifying module 17 of the smartphone 2a through the internet 4 in a returning step 24.

The received location identifier is then displayed to the user on the visual display 11 of the smartphone 2a as text comprising the unique three word sequence in a displaying step 25. Alternatively, or additionally, in the displaying step 25 the received location identifier may be provided to the user as speech comprising the unique three word sequence through the speaker 13. In some examples where the three word location identifier is provided to the user as speech, the speech may be generated from the text of the three word location identifier by the smartphone 2a.

The user can then use the location identifier comprising the unique three word sequence to identify their present location. For example, the user may memorize or record the unique three word sequence so that they can use the three word sequence to identify their current location at a later time. In another example the user may say the three word sequence to another person, either in face to face conversation, or by telephone, to communicate the location to the other person so that they can identify the location. In another example the user may communicate the location by sending the three word sequence to another person as text, for example using email or SMS, so that the other person can identify the location. In another example the user may communicate the location by making the three word sequence available through social media, so that a person or persons having access to the social media can identify the location.

In other examples, instead of identifying a user's current location, the obtained latitude and longitude coordinates may be another location, for example a proposed location for a meeting or a visit, or a location the user or a third party may find of interest. In such examples, since the latitude and longitude coordinates are not the current location of the user they must be obtained in a different way. For example, the latitude and longitude coordinates may be obtained from a mapping application on the user smartphone by the user selecting a location of interest on a displayed map and the mapping application providing the latitude and longitude coordinates of the selected location.

Figure 4:
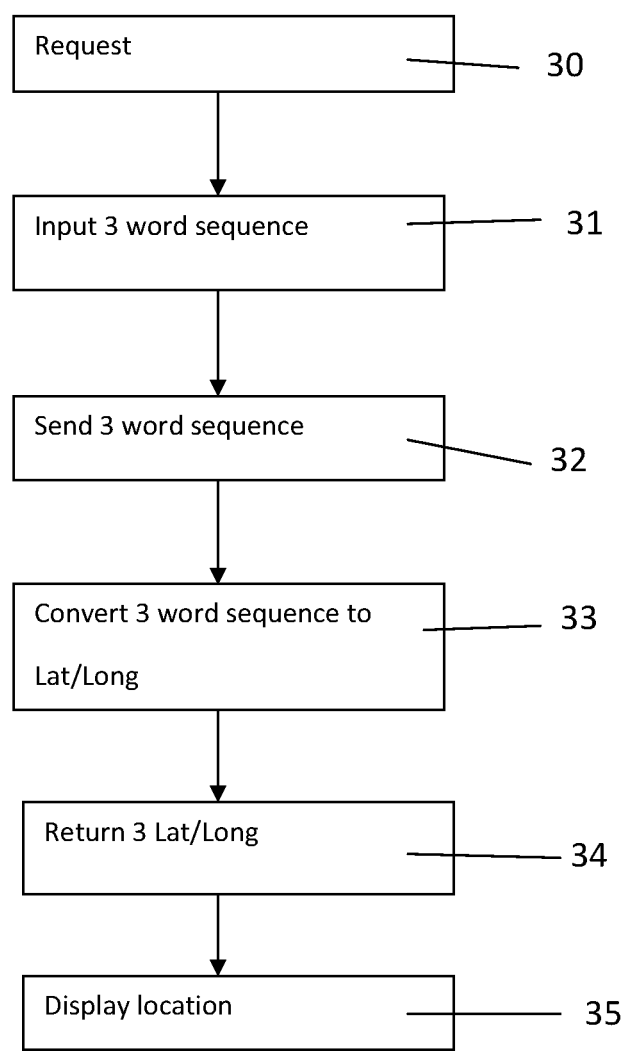
FIG. 4 is a flow diagram of operation in a second direction of the system of FIG. 1.

FIG. 4 is a flow chart of another example of a location based service according to the present invention. In the example of FIG. 4, the smartphone 2 shows a user the location identified by a location identifier comprising a unique three word sequence known to the user. The user may, for example, want this location identified so that they can travel to the location.

First, the user makes a request to be shown the location identified by a location identifier comprising a unique three word sequence to the smartphone 2a in a request step 30.

Then, the user inputs the three word sequence location identifier, for example "bread singing holster", using the user interface 12 in an input step 31. Alternatively, in some examples, the request and/or input may be made verbally using the microphone 14. In such examples the smartphone 2a must comprise or have access to suitable speech recognition means.

The smartphone 2a passes the input three word sequence location identifier to the location identifying module 17, and the location identifying module 17 then sends the three word location identifier to the server 3 through the internet 4 using the communications functionality of the smartphone 2 in a sending step 32.

The server 3 then converts the received unique three word sequence location identifier into latitude and longitude coordinates to six decimal places, for example "73.354721, 23.879527", in a converting step 33. This conversion is carried out using an algorithm described in detail below.

The server 3 then returns these latitude and longitude coordinates to the location identifying module 17 of the smartphone 2 through the internet 4 in a returning step 34.

The location identifying module 17 then passes the received latitude and longitude coordinates to the location determining means 15, and the location determining means 15 then displays the determined location to the user on the visual display 11 of the smartphone 2a in a display step 35. For example, the location determining means 15 may display a map on the visual display 11 including, or centered on, the determined location, and indicate the determined location as a mark or cursor on a map. Alternatively, or additionally, in the display step 35 the location determining means 15 may display directions on the visual display 11 to guide the user to the determined location. In some examples where the user is directed to the determined location, the directions may be given as speech through a speaker of the smartphone 2a.

In the illustrated example the system 1 comprises user devices 2 in the form of user smartphones 2a and personal computers (PC) 2b. In other examples the system 1 may additionally, or alternatively, comprise user devices 2 in the form of other types of computing device, for example laptops and tablet computers. This list of examples is not intended to be exclusive.

In the illustrated example some of the user devices are user smartphones 2a comprising a location determining means. It is not essential that all the user devices comprise a location determining means. In other examples some or all the user devices 2 may be arranged to communicate with separate location determining means. In other examples some or all the user devices 2 may have no access to position determining means. Some functionality of the system may not be available through a user device 2 having no access to position determining means, for example identifying the current location of the user, however, the system can still be used through such a user device 2 to provide other services, for example identifying a proposed location for a meeting or showing the location identified by a location identifier.

In the illustrated example the user devices are user smartphones 2a comprising a mapping or navigation module. It is not essential that the user devices comprise a mapping or navigation module.

In some examples the system 1 may comprise a website which may be accessed by user computing devices. In some examples the website may be hosted by the server 1. In other examples the website may be hosted by a separate server. In such examples the website may provide mapping and/or navigation functions to the accessing user computing devices.

As discussed above, according to the present invention locations are identified using unique location identifiers or names made up of words in place of numerical coordinates, with each location identifier being made up of three words in a specific sequence, and the method and apparatus of the invention carry out conversion of geographical coordinates into unique three word location identifiers, and carry out conversion of unique three word location identifiers into geographical coordinates. Such location identifiers made up of a sequence of three words are generally much easier for users to remember and to communicate in written communication and verbally than the strings of numbers making up geographical coordinates. For example, using the first example given above, most people will find the phrase "tablet microphone excited" easier to remember, to write, to read, to say, and to understand in speech, than the number sequence "52.123456, −0.654321". This is also true for other forms of encoding geographical position which use letter and number sequences to identify geographical coordinates, most people will find the phrase "tablet microphone excited" easier to remember, to write, to read, to say, and to understand in speech, than a random letter and number sequence, such as "t6D3we1".

The theory of operation of the invention can be explained as follows. By using GPS coordinates in the form of latitude and longitude coordinates defined to six decimal places every location on the surface of the earth can be uniquely identified as being in a specific approximately 3 meter by 3 meter box or area. Defining locations to this approximately 3 m by 3 m granularity is sufficiently accurate for most purposes.

To cover the entire surface of the earth, the total number of different boxes which must be uniquely identified is about $5.7*10^{13}$, or 57 million. If each unique name is made up of three real words in a specific sequence defining this number of unique names will require approximately 38,500 real words, which are readily available in most languages, such as in English.

In an alternative example, if only those approximately 3 m by 3 m boxes located on land are taken into account and assigned location identifiers, and the generally uninhabited regions around the north and south poles are excluded, the total number of different boxes which must be uniquely identified is about $2.7*10^{13}$, or 27 million. If each unique name is made up of three real words in a specific sequence defining this number of unique names will require approximately 25,000 real words, which are readily available in most languages, such as in English.

It is preferred that the words used to form the three word sequences are real words. This may make it easier for users to remember, pronounce, write and identify the words.

As is explained above, in the present invention an algorithm is used to convert latitude and longitude coordinates into three word sequence location identifiers, and vice versa.

In principle, it might appear possible to generate a database containing all of the word combinations corresponding to every location definable using a unique six decimal place latitude and longitude coordinate and carry out the conversion by using a coordinate, or three word sequence, to look up the corresponding three word sequence or coordinate respectively. However, this brute force approach would require a database many hundreds of terabytes in size, and this would in practice be difficult to handle. In particular, such a database would be difficult or impossible to search in any practicable time in order to carry out the desired conversions. Accordingly, in the present invention an algorithm is used to carry out the conversions.

Figure 5:
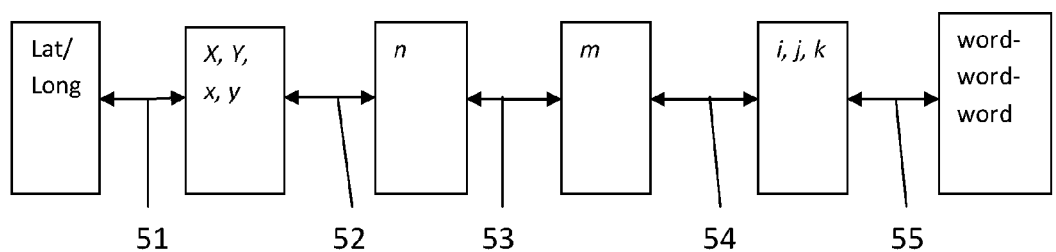
FIG. 5 is a diagram of the operation of the server of the system of FIG. 1.

The general structure of an example of a conversion algorithm according to the present invention is shown in FIG. 5. The algorithm 40 as a whole is reversible, and each of the steps making up the algorithm is also reversible. Accordingly, the same algorithm 40 can be used to convert latitude and longitude coordinates into three word sequence location identifiers, and to convert three word sequence location identifiers into latitude and longitude coordinates.

A cell and position value conversion step 51 converts latitude and longitude coordinates into four integer cell and position values X, Y, x, y, and vice versa.

An attractiveness rating step 52 converts the four integer cell and position values X, Y, x, y into a single integer value n, and vice versa.

A shuffling and unshuffling step 53 converts the integer n into a different integer m, and vice versa.

A splitting and combining step 54 converts the integer m into three integers i, j, k, and vice versa.

A word conversion step 55 converts each of the integers i, j, k into a word, and vice versa.

The algorithm converts latitude and longitude coordinates into three word sequence location identifiers by carrying out each of the steps in a first, forward, direction in the sequence 51-52-53-54-55. The algorithm converts three word sequence location identifiers into latitude and longitude coordinates by carrying out each of the steps in a second, reverse, direction in the sequence 55-54-53-52-51.

The different steps 51 to 55 of the algorithm will now be described in more detail. They are described in the order in which they are carried out to convert a latitude and longitude coordinate into a three word sequence location identifier.

The cell conversion step 51 converts six decimal place latitude and longitude coordinates, such as GPS coordinates, into four integer cell and position values X, Y, x, y, and vice versa. The present invention divides the surface of the world into an array or grid of approximately $3.7*10^7$, that is approximately 37 million, cells. At the equator these cells are squares 4.64 km, that is about 5 km, on a side. Because of the approximately spherical shape of the earth the size and shape of these cells will vary, with the cells being approximately constant in width in the North-South direction, and varying in width in the East-West direction, the East-West dimension of the cells generally being smaller at locations further from the equator. However, since both latitude and longitude coordinates and the cells are defined in angular terms this does not affect the accuracy of the conversion.

The pair of integer cell values X and Y identify which cell a location is in, while the pair of integer position values x and y indicate where within that cell the location is situated. Specifically, the pair of integer position values x and y identify a specific 3 m by 3 m box within the cell identified by the pair of integer cell values X and Y. Thus the pair of integer cell values X and Y are a coordinate defined in terms of the cell grid, while the pair of integer position values x and y are a coordinate within a cell. Accordingly, the four integer values X, Y, x, y are referred to as cell and position values. Cells are assigned a differing range of position values x, y based on the area of the cell, so that cells with a larger area are assigned a larger number of position values x, y. Thus, for this reason also, the East-West dimension of the cells generally being smaller at locations further from the equator does not affect the accuracy of the conversion. As a result, cells with a larger area contain a larger number of identifiable locations, so that the granularity, or the size of the area of each identifiable location, is approximately constant. Cells nearer to the equator will generally be assigned a larger number of position values x, y and identifiable locations.

In the first, forward, direction used when converting latitude and longitude coordinates into three word sequences the following formulas are used to calculate cell and position values X, Y, x and y:

$$X = \text{floor}((\text{Longitude}+180)*24) \quad (1)$$

$$Y = \text{floor}((\text{Latitude}+90)*24) \quad (2)$$

$$x = \text{floor}(W(Y)*\text{frac}((\text{Longitude}+180)*24)) \quad (3)$$

Where $W(Y) = \max(1, \text{floor}(1546*\cos((Y+0.5)/24-90)))$ $$y = \text{floor}(1546*\text{frac}((\text{Latitude}+90)*24)) \quad (4)$$

Where the floor of a real number is the largest integer less than or equal to that real number. The fractional part of the real number q is q−floor(q); we write this as frac(q). More informally, the floor of a real number is the part before the decimal point and the fractional part is the part after the decimal point.

(So floor(3.1415)=3 and frac(3.1415)=0.1415).

In the second, reverse, direction used when converting three word sequences into latitude and longitude coordinates the following formulas are used to calculate latitude and longitude values:

$$\text{Latitude} = (Y+((y+0.5)/1546))/24-90 \quad (5)$$

$$\text{Longitude} = (X+(x+0.5)/(W(Y)))/24-180 \quad (6)$$

Again, where $W(Y) = \max(1, \text{floor}(1546*\cos((Y+0.5)/24-90)))$.

Although this cell conversion step 51 is reversible, it is only imperfectly reversible, and not perfectly reversible. That is, if an original latitude and longitude coordinate is converted to a integer cell and position value, and then converted back into a final latitude and longitude coordinate the original and final latitude and longitude coordinates will be slightly different. However, in practice the difference is small, about 2.1 m at a maximum, and does not cause a problem in the present example where the granularity of the location identification by the three word sequences is about 3 m by 3 m. This imperfect reversibility arises in part from the fact that the latitude and longitude coordinates are real numbers, while the cell and position values are integers.

The attractiveness rating step 52 converts the four integer cell values X, Y, x, y into a single integer value n, and vice versa. The integer value n is referred to as the attractiveness rating. As explained above regarding the cell conversion step 51, each pair of integer cell values X and Y identify a specific cell, each cell being approximately a 5 km by 5 km square at the equator. As discussed above, the size and shape of the cells varies at different locations. The integer value n is a value assigned to a cell indicating the relative degree or amount that users of the system are expected to want to identify locations in that cell, or, in other words, the attractiveness of the cell. For example, it may be expected that more users will want to identify locations in a cell located in the middle of a major city, such as London, than will want to identify locations in a cell in a wilderness area, such as the Sahara Desert. More generally, it may be expected that more users will want to identify locations in a cell located in an urban area than will want to identify locations in a cell in a rural area.

The attractiveness rating n of a location is used to determine what words are used to form the word sequence assigned to that location. In the illustrated example locations regarded as being of more interest to users are assigned a lower value of n, and locations assigned a lower value of n are assigned more user friendly words to form the word sequence assigned to that location. The question of which words are regarded as more user friendly is inevitably to some extent subjective. However words may generally be regarded as more user friendly if they are easier for users to use, so for example, shorter words, words in more common use, words which are not easily mistaken for other words, and/or words with simpler spelling and pronunciation may generally be considered more user friendly.

In the attractiveness rating step 52, each cell, which is identified by a specific pair of integer cell values X and Y, is assigned a corresponding range of values of n, where each value of n in the range corresponds to a specific pair of integer position values x and y. Thus, each set of four integer cell values X, Y, x, y corresponds to a single integer value n, and vice versa.

This correspondence is illustrated by table 1, which shows an explanatory relationship between examples of cell values X and Y and number ranges of n. Please note that the values in table 1 are illustrative to explain the principle involved, and do not necessarily correspond to values which would be used in practice.

TABLE 1

| X | Y | n value range |
|---|---|---|
| 100 | 60 | 100,000,001-105,000,000 |
| 110 | 40 | 9,000,000,001-9,010,000,000 |
| 170 | 20 | 2,000,000,001-2,004,000,000 |

Table 1 shows three examples of cells in a table, the cells identified by the cell number pairs X and Y with values (100, 60), (111, 40) and (170, 20). Each cell is assigned a unique range of values of n.

As can be seen in table 1, the different cells have assigned ranges of values of n containing different numbers of values. This corresponds to the range of position values x, y assigned to the cell, which in turn depends on the area of the cell, as explained above. In the examples shown in table 1, cell (100, 60) is in a major city, so that it is regarded as having a high attractiveness, and so has the lowest range of n values, cell (170, 20) is urban, so that it is regarded as having a median attractiveness, and so has a median range of n values, and cell (110, 40) is rural, so that it is regarded as having a low attractiveness, and so has the highest range of n values. Further, In the examples shown in table 1, cell (110, 40) has the largest area, and so has the largest sized range of n values, cell (100, 60) has a median area, and so has a median sized range of n values, and cell (170, 20) has the smallest area, and so has the smallest range of n values.

The system used to assign attractiveness to cells may be as complex as desired in any specific system. The complexity of the procedure used to assign attractiveness has no impact on the operation of the system. In one example, attractiveness is assigned to cells based on the country they are in, and whether they are rural, or urban, or in a major city. Urban cells are assigned a higher attractiveness than rural cells, and cells in a major city are assigned a higher attractiveness than urban cells. Cells in different countries may, for example, be assigned attractiveness values based on how likely users from the home country of the system operator, and/or using the language of the system, are to travel to the countries. In some examples, cells in cities identified as very major cities or as very common travel destinations may be treated as a special case and regarded as having a very high attractiveness, for example London and Paris.

In order to convert the four integer cell values X, Y, x, y into a single integer value n, and vice versa, an attractiveness table is used. The attractiveness table is a lookup table containing the value of the lowest value of the n value range assigned to each cell. Thus, the lookup table will have a number of entries equal to the number of defined cells, or, in other words, the number of pairs of valid integer cell values X and Y.

The contents of the attractiveness table are illustrated by table 2, which shows an explanatory relationship between examples of cell values X and Y and lowest values of the assigned number range of n. Please note that the values in table 2 are illustrative to explain the principle involved, and do not necessarily correspond to values which would be used in practice.

TABLE 2

| X | Y | Lowest n value in range |
|---|---|---|
| ... | ... | ... |
| 100 | 60 | 100,000,001 |
| ... | ... | ... |
| 110 | 40 | 9,000,000,001 |
| ... | ... | ... |
| 170 | 20 | 2,000,000,001 |
| ... | ... | ... |

Table 2 shows three examples of cells in a table, the cells identified by the cell number pairs X and Y with values (100, 60), (110, 40) and (170, 20). Each cell is assigned a unique range of values of n, and thus a unique lowest value of n.

As explained above, there are only about 37 million cells, which is a much smaller number than the about 57 million identifiable locations, so that the use of a look up table having an entry for each cell is practical.

In the first, forward, direction used when converting latitude and longitude coordinates into three word sequences, the value q of the lowest n value in range for the cell values X and Y is obtained from the attractiveness table, and then the following formula is used to calculate attractiveness value n:

$$n = q + 1546x + y \quad (7)$$

In many standard programming languages, the attractiveness table look up table could be encoded as a two-dimensional array indexed by X and Y. In SQL it can just be a database.

In alternative examples which do not cover the whole of the surface of the earth, when operating in the forward direction, if a given X and Y pair is not present in the table/database, this means that the place in question is somewhere not covered by the system, and so not assigned a three word phrase. In this case a suitable error message may be displayed.

In the second, reverse, direction used when converting three word sequences into latitude and longitude coordinates the position is a little more complicated. Since values of n will usually be somewhere within the range of values of n assigned to a cell, rather than being the highest or lowest value, it is not possible to simply look up the values of n in the table. Due to the very large numbers of defined identifiable locations, it is not practical to use a look up table with a separate entry for every possible value of n.

Accordingly, the attractiveness table is sorted by the value of the "lowest n value in range", resulting in a sorted attractiveness table.

An example of a sorted attractiveness table produced by sorting the entries of table 2 is shown in table 3.

TABLE 3

| X | Y | Lowest n value in range |
|---|---|---|
| ... | ... | ... |
| 100 | 60 | 100,000,001 |
| ... | ... | ... |
| 170 | 20 | 2,000,000,001 |
| ... | ... | ... |
| 110 | 40 | 9,000,000,001 |
| ... | ... | ... |

Then, the sorted attractiveness table is searched to find the largest "lowest n value in the range" value which is smaller than or equal to n.

Once the entry with this value of the "lowest n value in the range" is found, the corresponding values of X and Y can be read from the sorted attractiveness table. The following formulas are then used to calculate the x and y values:

$$x = (n-q) \text{div } 1546 \quad (8)$$

$$y = (n-q) \bmod 1546 \quad (9)$$

Where q is the value of "lowest n value in the range", div is the result of integer division, and mod is the remainder after integer division.

In principle the search could be done by going through the entire sorted attractiveness table entry by entry, but this is likely to be too time consuming to be practical. Intelligent search methods should be used. In some examples a binary search method is used, while in other examples an interpolation search method is used. These intelligent search methods are well known to the skilled person and will not be described in detail herein.

In examples where the sorted attractiveness table is implemented in SQL, or a similar language, which supports searches for values between two values using a BETWEEN operator, it is possible to use the following search method. The maximum size of the range of n values assigned to any cell is known, and for any value of n it is certain that there will be at least one "lowest n value in the range" with a value between n and n−maximum size. Accordingly, if a search is made for "lowest n value in the range" values between n and n−maximum size and the largest value found is used, this will be the correct value of "lowest n value in the range". In one example this will be a search between n and n−2,390,116.

This attractiveness rating step 52 is perfectly reversible.

Although the attractiveness table is referred to as a single table above, in some examples it may be preferred to maintain two differently ordered tables, the attractiveness table and sorted attractiveness table referred to above, with the separate table being used for conversions in different directions.

The shuffling and unshuffling step 53 converts the integer n into a different integer m, and vice versa.

This step is not essential, and may be omitted in some examples. However, it provides a number of advantages.

As noted above, in the attractiveness rating step 52, locations in the same cell tend to be assigned similar values of n. As a result of the way in which values of n are converted into words, and vice versa, it is likely that locations with similar values of n will receive similar three word sequences, for example with two identical words and a different third word.

This can result in a problem for users converting three word sequences into locations that if a three word sequence is entered incorrectly with one word wrong this may result in a wrong location being identified which is relatively close to the correct location. Such a wrong but close location may be plausible, and so may not be recognized by the user as being wrong. By including the shuffling and unshuffling step 53 it can be ensured that locations with similar values of n are exceptionally unlikely to receive similar three word sequences, so that if a three word sequence is entered incorrectly with one word wrong this is likely to result in a wrong location being identified which is remote from the correct location. Such a wrong and remote location may be implausible, and so may be recognized by the user as being wrong.

In some examples the system may assist the user to identify that a wrong location is remote and implausible. This assistance may for example be provided with a user interface of the system. In some examples the system may highlight which country or, if applicable, what city the identified location is in. In some examples the system may indicate when the identified location is in a different city and/or country to the current location of the user, in practice, in many applications of the system this will make it obvious to the user that an error has occurred.

In some examples, where the user is aware that the identified location is wrong so that an error has occurred, the system may assist the user to identify which word is incorrect to assist in identifying the error and recovering the correct three word sequence and location. This assistance may for example be provided with a user interface of the system.

Also, as noted above, in the attractiveness rating step 52, locations in cells regarded as more attractive are assigned lower values of n. As is explained below, locations with lower values of n are assigned three word sequences made up of more common words.

This can result in a problem that since cells must be assigned different attractiveness values and ranked in order, it is inevitable that different locations will be assigned different attractiveness values, and so assigned words regarded as more, or less, "better". Although in practice the results are unlikely to be noticeably different for cells of the same type, for example cells in the centers of different major cities, any perceived bias may have an impact on user attitudes and have a public relations impact. By including the shuffling and unshuffling step 53 it can be ensured that cells of a similar type are assigned combinations of words having a similar level of commonness, and any user perception of bias can be avoided.

The shuffling and unshuffling step 53 reversibly shuffles the integers n into a different set of integers m, and vice versa. In the illustrated example, integers with values 0-19,999,999,999 will be shuffled with each other, and then the integers with values in each consecutive block of 2,000,000,000 integers will be shuffled with each other. In other examples, different sizes of blocks may be used. In some examples, the different blocks may vary in size. In some examples the sizes of the blocks may vary over time.

In the first, forward, direction used when converting latitude and longitude coordinates into three word sequences, it is first determined whether the integer value n to be shuffled lies in the range 0-19,999,999,999. If not, n is converted to m using the equation:

$$m=(3,639,313*n) \bmod 20,000,000,000 \qquad (10)$$

Otherwise, in the case where n is greater than or equal to 20,000,000,000, n is converted to m using the equation:

$$m=(2,000,000,000*(n \operatorname{div} 2,000,000,000))+((24,036,583*(n \bmod 2,000,000,000)) \bmod 2,000,000,000) \qquad (11)$$

In the second, reverse, direction used when converting three word sequences into latitude and longitude coordinates, it is first determined whether the integer value m to be shuffled lies in the range 0-19,999,999,999. If not, m is converted to n using the equation:

$$n=(5,083,377*m) \bmod 20,000,000,000 \qquad (12)$$

Otherwise, in the case where m is greater than or equal to 20,000,000,000, m is converted to n using the equation:

$$n=(2,000,000,000*(m \operatorname{div} 2,000,000,000))+((9,664,108,247*(m \bmod 2,000,000,000)) \bmod 2,000,000,000) \qquad (13)$$

The specific equations 10 to 13 relate to the exemplary block sizes discussed above. If different, or varying, block sizes are used, corresponding changes should be made to the equations 10 to 13. For example, to provide different sized blocks or bands, the start numbers of the blocks or bands may be derived from a series of selected integers of increasing size, the series of integers preferably starting with 0 where the integers are manipulated to define the respective starting values of the successive different sized bands.

One way of achieving this may be to perform a mathematical operation on the selected integers to define the respective starting values of the successive different sized bands. The mathematical operation may comprise taking the cubed values of the selected integers. It will be appreciated that other methods of defining different sized bands are also valid. Some advantage is gained where the series of integers comprises an arithmetic progression of selected integers, e.g. 0, 3000, 6000, 9000, etc., but this is not essential.

In the first, forward, direction used when converting latitude and longitude coordinates into three word sequences, equations (10) and (11) can be collapsed to a single equation denoted as (11') as follows:

$$m=[\text{start of } n\text{'s band}]+((F\_i*[\text{position of } n \text{ in its band}]) \bmod [\text{size of } n\text{'s band}]) \quad (11')$$

In the second, reverse, direction used when converting three word sequences into latitude and longitude coordinates, equations (12) and (13) can be collapsed to a single equation denoted as (13') as follows:

$$n=[\text{start of } m\text{'s band}]+((R-i*[\text{position of } m \text{ in its band}]) \bmod [\text{size of } m\text{'s band}]) \quad (13')$$

For each of equations (11') and (13'), i indexes the band, and m and n are always in the same band such that [size of m's band]=[size of n's band]=S_i, say.

Given this, the only requirement (for forwards and backwards shuffling) is that $$F\_i*R\_i*i=K*S\_i+1 \text{ for some whole number } K.$$

In some examples the shuffling and unshuffling step 53 may carry out multiple shuffling or unshuffling operations in sequence.

The splitting and combining step 54 converts the integer m into three integers i, j, k, and vice versa. One requirement in doing this is to ensure that the conversion moves between small values of m and small values of i, j and k. This requirement is not essential, but if this requirement is met it will simplify the word conversion step 55.

It should be noted that in examples where the shuffling and unshuffling step 53 is not carried out, the splitting and combining step 54 will convert the integer n into three integers i, j, k, and vice versa.

In the first, forward, direction used when converting latitude and longitude coordinates into three word sequences the integer m is to be converted into three integers i, j, k.

First, we define l=floor (cuberoot(m)). It is then guaranteed to be the case that:

$$l^3 \leq m < (l+1)^3 \text{ i.e. } l^3 \leq m \leq l^3+3l^2+3l \quad (14)$$

There are then three possible cases, depending on the value of m.

In a first case where $l^3 \leq m < l^3+l^2+2l+1$:
Let $r=m-l^3$
Take i=l, j=r div(l+1), k=r mod(l+1).
In a second case where $l^3+l^2+2l+1 \leq m < l^3+2l^2+3l+1$:
Let $r=m-(l^3+l^2+2l+1)$.
Take i=r div(l+1), j=l, k=r mod(l+1).
In the third case where $l^3+2l^2+3l+1 \leq m < l^3+3l^2+3l+1$:
Let $r=m-(l^3+2l^2+3l+1)$.
Take i=r div l, j=r mod l, k=l.

In the second, reverse, direction used when converting three word sequences into latitude and longitude coordinates the three integers i, j, k are to be converted into a single integer m.

First, we define l=max(i, j, k).
If i=l, then the value of m is:

$$m=l^3+(l+1)j+k. \quad (15)$$

Otherwise, if j=l, then the value of m is:

$$m=l^3+l^2+2l+1+(l+1)i+k. \quad (16)$$

Otherwise, if k=l, then the value of m is:

$$m=l^3+2l^2+3l+1+li+j.$$

The word conversion step 55 converts each of the integers i, j, k into a word, and vice versa.

In the first, forward, direction used when converting latitude and longitude coordinates into three word sequences it is necessary to identify a word corresponding to each of the three integers i, j and k.

This can be done by compiling an ordered list of words and selecting the word corresponding in order to the value of each of the integers i, j and k. As discussed above, in one example the ordered list of words contains 38,000 different words. The selected three words are then arranged in the following order, first the word corresponding to value i, then the word corresponding to value j, and then the word corresponding to value k, to form the three word sequence.

In one example the list of words is stored as an array of strings and the word selection is done by array lookup, so that, for example, integer i is converted to the $i^{th}$ string in the array. In the illustrated example it is possible for the values of i, j and k to be zero, so this array must be zero indexed.

In this example it is possible for two, or even all three, of the words in a word sequence to be the same. In some alternative examples the word sequences may be selected such that they will always contain three different words.

The ordered list of words should be ordered with the most user friendly words assigned a lower position or value in the list. To some degree the question of user friendliness is subjective, and may include different considerations in different languages. However, in general it may be expected that more commonly used words, shorter words, and easily spelled and pronounced words will be regarded as more user friendly.

In some examples, the ordered list of words does not include words which are homophones of one another. This may provide an advantage of avoiding possible confusion.

The use of the word order i then j then k is not essential, another order could be used provided that the same order is used consistently. For example, the word order j then i then k would be used.

In the second, reverse, direction used when converting three word sequences into latitude and longitude coordinates it is necessary to convert three words into three corresponding integers i, j and k. This is done using an associative array, sometimes referred to as a dictionary or map.

In the associative array, if the three words in order are $W_0$, $W_1$, $W_2$ then the associative array a is initialized by setting $a[W_q]=q$ for each integer. Each word can then be converted to an integer by looking up the word corresponding to the integer value in the associative array.

If a user enters an invalid word, that is, a word that cannot be found in the associative array, a suitable error message will be returned for display on the user smartphone 2 identifying the unrecognized word.

Further, in practice, it will usually be the case that there are more possible word combinations than valid integer triples i, j, k and identifiable locations. In this case it is possible that a user could input three individually valid words which are not a valid three word sequence corresponding to an identifiable location. If this occurs, when operating in the second, reverse, direction used when converting three word sequences into latitude and longitude coordinates, the derived integer m (or n in examples not including the shuffling and unshuffling step 53) will have an invalid value, and a suitable error message will be returned for display on the user smartphone 2 stating that the three word sequence is incorrect.

In some examples, the ordered list of words does not include words which are homophones of one another. This may provide an advantage of avoiding possible confusion.

In some examples, when operating in the second, reverse, direction, the system may be able to identify input words which are homophones of words in the ordered list of words and then treat these input words as if they were the homophone word in the ordered list. In some examples this may be done automatically, in other examples the user may be prompted and asked whether the substitution should be made.

In some examples, the ordered list of words may include as a single entry a plurality of words which are homophones of one another. In such examples, when operating in the second, reverse, direction, the system may regard input of any of these words as equivalent to one another, so that they all produce the same integer value for i, j or k. In such examples the system may be arranged to output one of the plural homophones only when operating in the first, forward, direction.

In some examples the system may be able to identify input words which are alternative spellings of words in the ordered list of words and then treat these input words as if they were the corresponding alternatively spelled word in the ordered list.

Optionally, the system 1 may be provided with an additional bespoke words function. This bespoke words function is applied only in the second, reverse, direction used when converting three word sequences into latitude and longitude coordinates. A bespoke word is a single word, or alphanumeric sequence, selected by a users and assigned to a specific locations selected by the user. Users may be charged for selecting bespoke words.

When this option is used, the server 3 maintains a database storing all bespoke words and the corresponding location latitude and longitude coordinates. When the server 1 receives a bespoke word from a user smartphone 2, the server looks up the bespoke word in the database and returns the corresponding latitude and longitude coordinates, rather than following the sequence of steps described above. In practice, the number of bespoke words will be vastly smaller than the total number of identifiable locations, so such a simple look up approach will be acceptably fast to handle the bespoke words.

It should be noted that there may be a number of different bespoke words corresponding to the same location, in contrast with the three word sequences where each location corresponds to a single three word sequence.

It should be understood that bespoke words are not private to the user selecting them, but can be used by any user to find the selected location. That is, the bespoke words can be used by any user who is made aware of them.

For example, a hotel could select the bespoke word "hawthornhotel" and assign this to their own location so that customers or delivery personnel can use it to find the hotel. Since a hotel will generally be rather larger than 3 m by 3 m it is likely that this bespoke word will be assigned to the street or pavement outside the hotel main entrance. Further, a large hotel could have multiple bespoke words for different locations, such as "hawthornhotelserviceentrance" for the service entrance.

It is not essential that the bespoke words are a single word or textstring. However, this may be preferred to ensure that the bespoke words and the three word sequences cannot be confused. The use of a single word allows the server to easily distinguish bespoke words from standard three word sequences merely by their syntax, without any need for more complex analysis.

Optionally, in other examples, bespoke words could also be available in the first, forward, direction used when converting latitude and longitude coordinates into words. Again, since in practice, the number of bespoke words will be vastly smaller than the total number of identifiable locations, a simple look up approach can be used to check whether an input set of coordinates have a corresponding bespoke word, and to provide the bespoke word.

In some examples the system 1 may be arranged to operate in multiple different languages. In order to support the multiple languages a separate ordered list of words is provided for each language.

In multiple language systems the lists of words in each language may be assembled so that there are no words which are the same in the lists for the different languages. For example, the word "gift" is a valid word in both English and German, but this word would be included in only one of the English and German ordered word lists. This may provide the advantage that when operating in the second, reverse, direction converting three word sequences into latitude and longitude coordinates the server can identify the language of the input word sequence from the words themselves without needing to be told the language, because the words appear in only one language's word list.

In multiple language systems, when operating in the first, forward, direction used when converting latitude and longitude coordinates into three word sequences it may be desirable for the user to inform the system what language the three word sequence should be provided in. In some examples this informing may be carried out by default, for example the system may assume the user wishes to be provided with a three word sequence in the same language the user has elected to use on a website to access the system server. In some examples, absent such informing the system may provide the three word sequence in a default language.

In multiple language systems the attractiveness rating assigned to different cells may be varied in the different languages. For example, in English London would have a higher attractiveness rating than Paris, while in French, Paris would have a higher attractiveness rating than London. This will require the attractiveness rating step 52 to be carried out separately for each different language, with different values of n being assigned to the same cells in the different languages.

In the illustrated example, cells rated as more attractive are assigned lower values of n. In other examples cells rated as more attractive may be assigned higher values of n, provided that appropriate changes are made to the other steps of the algorithm.

In the illustrated example the three words must be in a specific sequence. In other examples the word sequence may not be taken into account. However, if word sequence is not taken into account, it is expected that the efficiency of the system will be decreased, that is, more unique words will be required to identify a given number of locations.

In the illustrated example the system covers the entire surface of the world. In other examples the geographical areas covered may be smaller. In some examples the system may cover only land areas. In other examples the substantially uninhabited wilderness areas around one or both poles may be excluded. In some examples the system may only cover a specific continent, country or region. In one example the system may only cover Europe, in one example the system may only cover the UK.

In the illustrated example a three word sequence is used. In other examples a sequence comprising a different number of words could be used. The use of three words may provide advantages. If only two words were used the number of unique words required would be too great to be easily provided by a single language and it would be necessary to use words which were unknown to users. This difficulty may not arise if the area covered by the system were smaller. If more than three words are used users may have difficulty remembering the sequence of words.

In the illustrated example the system comprises user smartphones. In other examples the smartphones may be replaced by alternative mobile communication devices or other user devices. Such alternative user devices will need sufficient communications functionality to be able to communicate with the server 3. However it is not necessarily the case that their primary function is to provide mobile communications to users.

In the illustrated example the system identifies locations with approximately 3 m granularity where each location is identified as being in a specific approximately 3 meter by 3 meter box or area. In other examples locations may be identified with a different granularity as being in a box or area having a different size.

In the illustrated example the location coordinates are GPS coordinates in the form of latitude and longitude coordinates to six decimal places. In other examples different coordinate systems may be used. Further, in some examples coordinates having different levels of accuracy may be used. It will be understood that the accuracy with which the invention can identify locations, that is, in the described example the size of the identified boxes or areas, will ultimately be dependent on the accuracy of the location coordinates.

In the illustrated example the location determining means is a satellite based navigation system such as GPS. In other examples different navigation systems may be used.

In the illustrated example a single central server is used. In other examples a distributed processing system, such as a network of servers, may be used instead of a single central server.

In the illustrated example the Internet is used for communication between the different parts of the system. In other examples different data communication networks may be used. In some examples the user devices may be able to use a number of different communication means to communicate with the server.

In the illustrated example the location identifying system comprises a central server accessed by a plurality of smartphones, or other computing devices. In other examples the entire system may be provided on a single computing device, such as a user personal computer (PC) or smartphone. In general, it is expected that the illustrated server based architecture may be preferred by users because the amount of data storage and processing required by the system may be difficult or costly to provide on some user computing devices. That being said, an advantage of providing the entire system on a single computing device such as a handheld computing device, e.g. a smartphone, a tablet computer or the like, is that the system can then be used off-line. By off-line is meant that the system can be used to produce a location identifier according to the invention or to identify a location from a location identifier without having to connect to another computing device such as a server over a network such as the internet irrespective of whether or not the handheld computing device is connected or able to be connected to a network. As before, the means for obtaining the geographical coordinates of a location may comprise part of the handheld computing device or may be an accessory device connected thereto by a wired or wireless connection.

The systems and apparatus described above may be implemented at least in part in software. Those skilled in the art will appreciate that the apparatus described above may be implemented using general purpose computer equipment or using bespoke equipment.

The different components of the systems may be provided by software modules executing on a computer.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Here, aspects of the methods and apparatuses described herein can be executed on a computing device such as a server. Program aspects of the technology can be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

The invention claimed is:

1. A computer implemented method of producing a location identifier comprising:
    receiving at a processor geographical coordinates of a location comprising strings of numbers from a location determining means;
    at said processor performing the steps of:
    converting the geographical coordinates comprising strings of numbers into a single unique integer n;
    converting the single unique integer n into a unique group of a plurality of integers; and
    converting the plurality of integers into a number of respective words where the number of respective words is equal to the number of integers comprising said unique group of plurality of integers; and
    making the number of respective words available to a location identifying module as a location identifier.

2. The method of claim 1, wherein the method further comprises defining an array of cells across a geographical area; and at said processor performing the step of converting the geographical coordinates comprising strings of numbers into a single unique integer n comprises performing the steps of:
    converting the geographical coordinates comprising strings of numbers into a cell identity value identifying the cell containing the location, and a cell position value identifying the position of the location within the cell; and
    converting the cell identity value and a cell position value into the single unique integer n.

3. The method of claim 2, wherein the geographical coordinates comprising strings of numbers comprise latitude and longitude coordinates.

4. The method of claim 1, wherein the plurality of words is in a defined sequence.

5. The method of claim 2, wherein the cell identity value is a pair of integers X, Y and the cell position value is a pair of integers x, y.

6. The method of claim 3, wherein the latitude and longitude coordinates are converted into the cell identity value and the cell position value using the equations:

$X = \text{floor}((\text{Longitude} + 180) * 24)$ $Y = \text{floor}((\text{Latitude} + 90) * 24)$ $x = \text{floor}(W(Y) * \text{frac}((\text{Longitude} + 180) * 24))$ $y = \text{floor}(1546 * \text{frac}((\text{Latitude} + 90) * 24))$ where $W(Y) = \max(1, \text{floor}(1546 * \cos((Y+0.5)/24 - 90)))$.

7. The method of claim 5, wherein the cell identity value and cell position value X, Y, x and y are converted into the single unique integer n by assigning each cell identified by a cell identity value X, Y a unique range of values of n having a lowest value q, and then obtaining n using the equation:

$n = q + 1546 * x + y$.

8. The method of claim 1, wherein the single unique integer n is converted into a unique group of three integers i, j, k,
    the three integers i, j and k are converted into three respective words; and
    the three words are provided as a location identifier.

9. The method of claim 8, wherein converting the single unique integer n into the unique group of three integers i, j, k comprises:
    converting the single unique integer n into a single unique integer number value m by dividing the possible number values of n into blocks of number values, and
    shuffling the number values of n in a block of number values to obtain m.

10. The method of claim 9, wherein converting the single unique integer n into a unique group of three integers i, j, k further comprises converting the single unique number value m into a unique group of three integers i, j, k by:
    defining $l = \text{floor}(\text{cuberoot}(m))$; then
    in the case where $l^3 \le m < l^3 + l^2 + 2l + 1$, then
    $i = l$, $j = r \text{ div } (l+1)$, and $k = r \mod (l+1)$, where $r = m - l^3$; or
    in the case where $l^3 + l^2 + 2l + 1 \le m < l^3 + 2l^2 + 3l + 1$, then
    $i = r \text{ div } (l+1)$, $j = l$, and $k = r \mod (l+1)$, where $r = m - (l^3 + l^2 + 2l + 1)$; or
    in the case where $l^3 + 2l^2 + 3l + 1 \le m < l^3 + 3l^2 + 3l + 1$, then
    $i = r \text{ div } l$, $j = r \mod l$, $k = l$, where $r = m - (l^3 + 2l^2 + 3l + 1)$.

11. The method of claim 10, wherein the unique group of three integers i, j, k are converted into three respective words by comparing each integer to an ordered list of words and converting each integer to the word at the position of the integer in the ordered list.

12. An apparatus adapted to produce a location identifier, said apparatus having a processor configured to:
    receive geographical coordinates of a location comprising strings of numbers from a location determining means; and;
    to perform the steps of:
    converting the geographical coordinates comprising strings of numbers into a single unique integer n;
    converting the single unique integer n into a unique group of a plurality of integers; and
    converting the plurality of integers into an a number of respective words where the number of respective words is equal to the number of integers comprising said unique group of a plurality of integers; and
    making the number of respective words available to a location identifying module as a location identifier.

13. A location identifier producing computer program stored in a non-transitory computer readable medium, the location identifier producing computer program comprising instructions which, when executed by a processor will cause the processor to:
  receive geographical coordinates of a location comprising strings of numbers from a location determining means; and;
  to perform the steps of:
    converting the geographical coordinates comprising strings of numbers into a single unique n integer n;
    converting the single unique integer n into a unique group of a plurality of integers; and
    converting the plurality of integers into a number of respective words where the number of respective words is equal to the number of integers comprising said unique group of plurality of integers; and
    making the number of respective words available to a location identifying module as a location identifier.

14. A computer implemented method of identifying a location comprising:
  receiving at a processor from a location identifying module a location identifier for a location, the location identifier comprising a plurality of words;
  at said processor performing the steps of:
  converting the plurality of words into a unique group of respective integers where the number of integers is equal to the number of words comprising said plurality of words;
    converting the unique group of integers into a single unique integer n;
    converting the single unique integer n into geographical coordinates comprising strings of numbers; and
    outputting the geographical coordinates comprising strings of numbers to a location determining means.

15. The method of claim 14, wherein the method further comprises defining an array of cells across a geographical area; and at said processor performing the step of converting the single unique integer n into geographical coordinates comprising strings of numbers comprises performing the steps of:
  converting the single unique integer n into a cell identity value identifying the cell containing the location and a cell position value identifying the position of the location within the cell; and
  converting the cell identity value and the cell position value into geographical coordinates comprising strings of numbers.

16. The method of claim 15, wherein the geographical coordinates comprising strings of numbers are latitude and longitude coordinates.

17. The method of claim 14, wherein the plurality of words is in a defined sequence.

18. The method of claim 15, wherein the cell identity value is a pair of integers X, Y and the cell position value is a pair of integers x, y.

19. The method of claim 15, wherein the cell identity value and the cell position value are converted into geographical coordinates comprising strings of numbers using the equations:

Latitude=$(Y+((y+0.5)/1546))/24*90$

Longitude=$(X+((x+0.5)/(W(Y)))/24-180$ where $W(Y)=\max(1, \text{floor}(1546*\cos((Y+0.5)/24-90)))$.

20. The method of claim 18, wherein the single unique integer n is converted into the cell identity value and cell position value X, Y, x and y by associating each cell identified by a cell identity value X, Y with a unique range of number values of n, each unique range having a lowest value q, and identifying the assigned range of number values of n in which the integer n lies; then taking the cell identity value X, Y associated with the identified assigned range, and determining x and y using the equations;

$x=(n-q)\text{div } 1546$ $y=(n-q)\text{mod } 1546.$

21. The method of claim 14, wherein the plurality of words comprises three words;
  the three words are converted into a unique group of three respective integers i, j and k; and
  the unique group of three values i, j, k are converted into a single unique integer n.

22. The method of claim 21, wherein converting the unique set of three integers i, j, k into the single unique integer n comprises:
  converting a single unique integer value m into the single unique integer n by dividing the possible number values of m into blocks of number values of equal size, and
  shuffling the number values of m in a block of number values to obtain n.

23. The method of claim 22, wherein converting the unique group of three integers i, j, k into the single unique integer n further comprises converting the single unique value m into a unique group of three values i, j, k by:
  defining l=max(i; j; k); then
  in the case where i=l, then $m=l^3+(l+1)j+k;$ or in the case where j=l, then $m=l^3+l^2+2l+1+(l+1)i+k;$ or in the case where k=l, then $m=l^3+2l^2+3l+1+li+j.$ 24. The method of claim 23, wherein the three words are converted into the unique group of three respective integers i, j, k by storing the words and integer values in an associative array, and looking up the word corresponding to each integer.

25. An apparatus adapted to identify a location, said apparatus having a processor configured to:
  receive a location identifier for a location from a location identifying module, the location identifier comprising a plurality of words; and
  to perform the steps of:
    converting the plurality of words into a unique group of respective integers where the number of integers is equal to the number of words comprising said plurality of words;
    converting the unique group of integers into a single unique integer n;
    converting the single unique integer n into geographical coordinates comprising strings of numbers; and
    outputting the geographical coordinates comprising strings of numbers to a location determining means.

26. A location identifying computer program stored in a non-transitory computer readable medium, the location identifier producing computer program comprising instructions which, when executed by a processor will cause the processor to:

receive a location identifier for a location from a location identifying module, the location identifier comprising a plurality of words; and to perform the steps of:
- converting the plurality of words into a unique group of respective integers where the number of integers is equal to the number of words comprising said plurality of words;
- converting the unique group of integers into a single unique integer n;
- converting the single unique integer n into geographical coordinates comprising strings of numbers; and
- outputting the geographical coordinates comprising strings of numbers to a location determining means.

* * * * *